(12) United States Patent
Ma et al.

(10) Patent No.: US 10,801,659 B2
(45) Date of Patent: Oct. 13, 2020

(54) HANDHELD GIMBAL

(71) Applicant: SZ DJI OSMO TECHNOLOGY CO., LTD., Shenzhen (CN)

(72) Inventors: Tianhang Ma, Shenzhen (CN); Xifeng Zhao, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/259,494

(22) Filed: Jan. 28, 2019

(65) Prior Publication Data
US 2019/0154191 A1 May 23, 2019

Related U.S. Application Data

(63) Continuation of application No. PCT/CN2016/093135, filed on Aug. 3, 2016.

(51) Int. Cl.
| | |
|---|---|
| *F16M 13/00* | (2006.01) |
| *F16M 11/12* | (2006.01) |
| *F16M 13/04* | (2006.01) |
| *G03B 17/56* | (2006.01) |
| *F16M 11/08* | (2006.01) |
| *F16M 11/10* | (2006.01) |

(52) U.S. Cl.
CPC .......... *F16M 11/123* (2013.01); *F16M 11/08* (2013.01); *F16M 11/10* (2013.01); *F16M 11/12* (2013.01); *F16M 13/04* (2013.01); *G03B 17/561* (2013.01); *G03B 17/563* (2013.01); *F16M 2200/041* (2013.01)

(58) Field of Classification Search
CPC ..... F16M 13/04; F16M 11/041; G03B 17/561
USPC ....... 248/122, 122.1; 396/419, 420; 352/243
See application file for complete search history.

(56) References Cited

U.S. PATENT DOCUMENTS

| | | | | |
|---|---|---|---|---|
| 7,936,984 B2* | 5/2011 | Greb | ...................... | F16M 13/04 |
| | | | | 396/421 |
| 8,585,205 B2* | 11/2013 | Greaves | ............... | F16M 11/046 |
| | | | | 348/376 |
| 9,458,963 B1* | 10/2016 | Choi | ...................... | G01C 21/16 |
| 9,874,308 B2* | 1/2018 | Saika | .................. | F16M 11/121 |
| 10,174,879 B2* | 1/2019 | Zhao | ...................... | F16M 13/04 |
| 10,365,543 B2* | 7/2019 | O'Neill | ............... | G03B 17/563 |

(Continued)

FOREIGN PATENT DOCUMENTS

| | | |
|---|---|---|
| CA | 2340614 A1 | 9/2001 |
| CN | 201837815 U | 5/2011 |

(Continued)

OTHER PUBLICATIONS

The World Interllectual Property Organization (WIPO) The International Search Report for PCT/CN2016/093135 dated Sep. 28, 2016 8 pages.

*Primary Examiner* — Steven M Marsh
(74) *Attorney, Agent, or Firm* — Anova Law Group, PLLC

(57) ABSTRACT

A handheld gimbal includes a handle and a stabilizer. The handle includes a grip portion and a rotating portion rotatably connected to the grip portion. The stabilizer is mounted at the rotating portion and positioned distal from the grip portion. The stabilizer is configured to carry an imaging assembly. The rotating portion is configured to drive the stabilizer to rotate relative to the grip portion to switch the handheld gimbal from a first attitude to a second attitude.

19 Claims, 7 Drawing Sheets

(56) References Cited

U.S. PATENT DOCUMENTS 10,432,863 B2 * 10/2019 Appel .................. F16M 11/123
10,536,630 B2 * 1/2020 Enke .................... F16M 11/123

FOREIGN PATENT DOCUMENTS

| | | |
|---|---|---|
| CN | 202868219 U | 4/2013 |
| CN | 103984193 A | 8/2014 |
| CN | 204929513 U | 12/2015 |
| CN | 205299022 U | 6/2016 |
| CN | 205402139 U | 7/2016 |
| CN | 205402193 U | 7/2016 |
| GB | 2521865 A | 7/2015 |
| JP | H05103322 A | 4/1993 |

* cited by examiner

HANDHELD GIMBAL

CROSS-REFERENCE TO RELATED APPLICATION

This application is a continuation of International Application No. PCT/CN2016/093135, filed on Aug. 3, 2016, the entire contents of which are incorporated herein by reference.

TECHNICAL FIELD

The present disclosure relates to an imaging apparatus, and more particularly to a handheld gimbal.

BACKGROUND OF THE DISCLOSURE

A handheld gimbal can be small and easy to carry. A compact imaging device such as a camcorder, a camera or a smartphone can be carried on the handheld gimbal. The handheld gimbal can maintain the imaging device at a determined attitude quickly and stably for movement. However, a handle of existing handheld gimbals is generally designed as a fixed structure. An imaging mode is thus limited to a horizontal imaging or a vertical imaging, and a posture change in holding the handle is needed to switch the imaging mode, causing inconvenience in imaging and holding.

SUMMARY OF THE DISCLOSURE

There is a need to provide a handheld gimbal solving the technical problems discussed hereinabove.

An aspect of the present disclosure discloses a handheld gimbal comprising a handle and a stabilizer provided at an end of the handle, the stabilizer carrying an imaging assembly. The handle can comprise a grip portion and a rotating portion rotatably connected to the grip portion. The stabilizer can be mounted on the rotating portion and positioned distal from the grip portion. The rotating portion can drive the stabilizer to rotate relative to the grip portion to switch the handheld gimbal from a first attitude to a second attitude.

In some embodiments, a rotating shaft can be provided at the grip portion or the rotating portion, the rotating portion being rotated relative to the grip portion about the rotating shaft.

In some embodiments, a first fitting surface can be formed at an end of the grip portion proximal to the rotating portion. A second fitting surface corresponding to the first fitting surface can be formed on the rotating portion, the first fitting surface being fitted with the second fitting surface.

In some embodiments, the first fitting surface and the second fitting surface can be inclined surfaces.

In some embodiments, the first fitting surface can comprise an arc section and a planar section which is continuously connected to the arc section. The second fitting surface can be an arc surface.

In some embodiments, the arc section of the first fitting surface can partially abut against the second fitting surface when the handheld gimbal operates at the first attitude. The arc section of the first fitting surface can be fitted with and abut against the second fitting surface and the planar section can be fitted with a side of the rotating portion when the handheld gimbal operates at the second attitude.

In some embodiments, a rotating shaft can be provided at one of the first fitting surface and the second fitting surface. A shaft hole can be provided at the other one of the first fitting surface and the second fitting surface, the rotating shaft being received in the shaft hole and pivotally connected to a sidewall of the shaft hole.

In some embodiments, a connecting protrusion can be provided protruding from the grip portion. The rotating portion can comprise a first side, a second side, a third side and a fourth side connected to each other in this order. A mounting groove can be provided at an end of the rotating portion proximal to the grip portion, the mounting groove penetrating the first side and the third side of the rotating portion. The connecting protrusion can be received in the mounting groove and rotatably connected to two sidewalls of the mounting groove.

In some embodiments, when the handheld gimbal operates at the first attitude, the imaging assembly can be positioned above the rotating portion, the rotating portion and the grip portion being superimposed along a same line to form a cylinder, and the handheld gimbal being in a vertical imaging mode.

In some embodiments, when the handheld gimbal operates at the second attitude, the imaging assembly and the rotating portion can be positioned along a same horizontal line, the handheld gimbal being in a horizontal imaging mode.

In some embodiments, the stabilizer can comprise at least one bracket capable of being rotatably connected to the rotating portion. The at least one bracket can support the imaging assembly.

In some embodiments, the at least one bracket can comprise a first bracket and a second bracket. The first bracket can be connected to the rotating portion and rotatable relative to the rotating portion. The first bracket can be capable of rotating about a first axis and the second bracket can be capable of rotating about a second axis.

In some embodiments, the first axis can be perpendicular to the second axis.

In some embodiments, when the handheld gimbal operates at the first attitude, the second bracket can be capable of rotating about the second axis at an angle ranging from −45° to +90°, and the first bracket can be capable of rotating about the first axis at an angle ranging from −360° to +300°. When the handheld gimbal operates at the second attitude, the second bracket can be capable of rotating about the second axis at an angle ranging from −45° to +90°, and the first bracket can be capable of rotating about the first axis at an angle ranging from −360° to +300°.

In some embodiments, the at least one bracket can further comprise a third bracket, the third bracket being rotatably connected to the second bracket. The third bracket can be capable of rotating about a third axis.

In some embodiments, the third axis can be perpendicular to the first axis and the second axis.

In some embodiments, when the handheld gimbal operates at the first attitude or the second attitude, the third bracket can be capable of rotating about the third axis at an angle ranging from −45° to +45°.

In some embodiments, the first bracket can be provided with a foldable structure, the first bracket comprising a first connecting portion and a second connecting portion rotatably connected to the first connecting portion. A rotation shaft can be provided at a joint between the first connecting portion and the second connecting portion. An end of the second connecting portion distal from the first connecting portion can be connected to the second bracket. The second connecting portion can be rotatable relative to the first connecting portion by the rotation shaft to effect a folding.

In some embodiments, the first bracket can be rotatably connected to the rotating portion via a first driving member.

In some embodiments, the second bracket can be rotatably connected to the first bracket via a second driving member.

In some embodiments, the third bracket can be rotatably connected to the second bracket via a third driving member.

In some embodiments, the stabilizer can further comprise a supporting seat connected to the at least one bracket, the supporting seat carrying the imaging assembly.

In some embodiments, the supporting seat can comprise a first clamping portion and a second clamping portion. The first clamping portion can be connected to the at least one bracket. The second clamping portion can be retractably coupled to the first clamping portion.

In some embodiments, when the handheld gimbal operates at the first attitude, the at least one bracket can be arranged as a pitch bracket, a roll bracket and a yaw bracket from an innermost side to an outermost side, the innermost side being a side of the at least one bracket which can be directly connected to the imaging assembly.

In some embodiments, when the handheld gimbal operates at the second attitude, the at least one bracket can be arranged as a yaw bracket, a bracket roll and a pitch bracket from an innermost side to an outermost side, the innermost side being a side of the at least one bracket which can be directly connected to the imaging assembly.

In some embodiments, an operational portion capable of controlling the imaging assembly can be provided at the rotating portion.

In some embodiments, the operational portion can comprise at least one of a button or a touch panel.

In some embodiments, electrical connectors can be provided at the rotating portion and the grip portion. When the rotating portion is rotated relative to the grip portion to a predetermined position, the electrical connectors can electrically connect the stabilizer, the imaging assembly and the grip portion, allowing a control of the imaging assembly and/or the stabilizer by the grip portion.

In comparison with the existing handheld gimbal, the handle of the handheld gimbal as provided by the disclosure can comprise a grip portion and a rotating portion rotatably connected to the grip portion. An switch in an attitude of the handheld gimbal can be effected by simply rotating the rotating portion relative to the grip portion. There's no need to change an attitude of the handle, thereby facilitating a user of the handheld gimbal.

LIST OF REFERENCE NUMERALS

TABLE 1

| | |
|---|---|
| Handheld gimbal | 100, 200, 300 |
| Handle | 110, 210, 310 |
| Stabilizer | 130, 230, 330 |
| Imaging assembly | 150, 250, 350 |
| Grip portion | 113, 213, 313 |
| Operational portion | 1153 |
| Connecting protrusion | 3130 |
| Rotating portion | 115, 215, 315 |
| Mounting groove | 3150 |
| First side | 3151 |
| Second side | 3152 |
| Third side | 3153 |
| Fourth side | 3154 |
| First fitting surface | 1131, 2131, 3131 |
| Arc section | 3133 |
| Planar section | 3135 |
| Rotating shaft | 117, 317 |
| Second fitting surface | 1151, 2151, 3157 |
| First bracket | 131, 231, 331 |
| First connecting portion | 2311 |
| Second connecting portion | 2313 |
| Rotation shaft | 2315 |
| Second bracket | 132, 232, 332 |
| Third bracket | 133, 233, 333 |
| First driving member | 141 |
| Second driving member | 142 |
| Third driving member | 143 |
| Supporting seat | 235, 335 |
| First clamping portion | 2351, 3351 |
| Second clamping portion | 2353, 3353 |

The present disclosure will be described in the illustrative embodiments by reference to the drawings.

DETAILED DESCRIPTION OF THE EMBODIMENTS

A better understanding of the disclosure will be obtained by reference to the following detailed description that sets forth illustrative embodiments with reference to the drawings. It will be apparent that, the embodiments described herein are merely provided by way of example. Those skilled in the art can conceive other embodiments in light of those embodiments disclosed herein without inventive efforts, and all these embodiments are within the scope of the disclosure.

It will be apparent that, if a component is described as "being fixed to" another component, it can be directly fixed to the other component, or an intermediate component can be provided therebetween. If a component is described as "being coupled to" another component, it can be directly coupled to the other component, or an intermediate component can be provided therebetween. If a component is described as "being disposed on" another component, it can be disposed directly on the other component, or an intermediate component can be provided therebetween. Terms such as "vertical", "horizontal", "left", "right", as used in the disclosure, are merely illustrative.

Unless otherwise defined, technical and scientific terms, as used in the disclosure, have the same meaning as commonly understood by those skilled in the field of the disclosure. The terms as used in the disclosure are intended to illustrate the embodiments, not to limit the disclosure. The term "and/or", as used in the disclosure, comprises any and all combinations of one or more items as listed.

Figure 1:
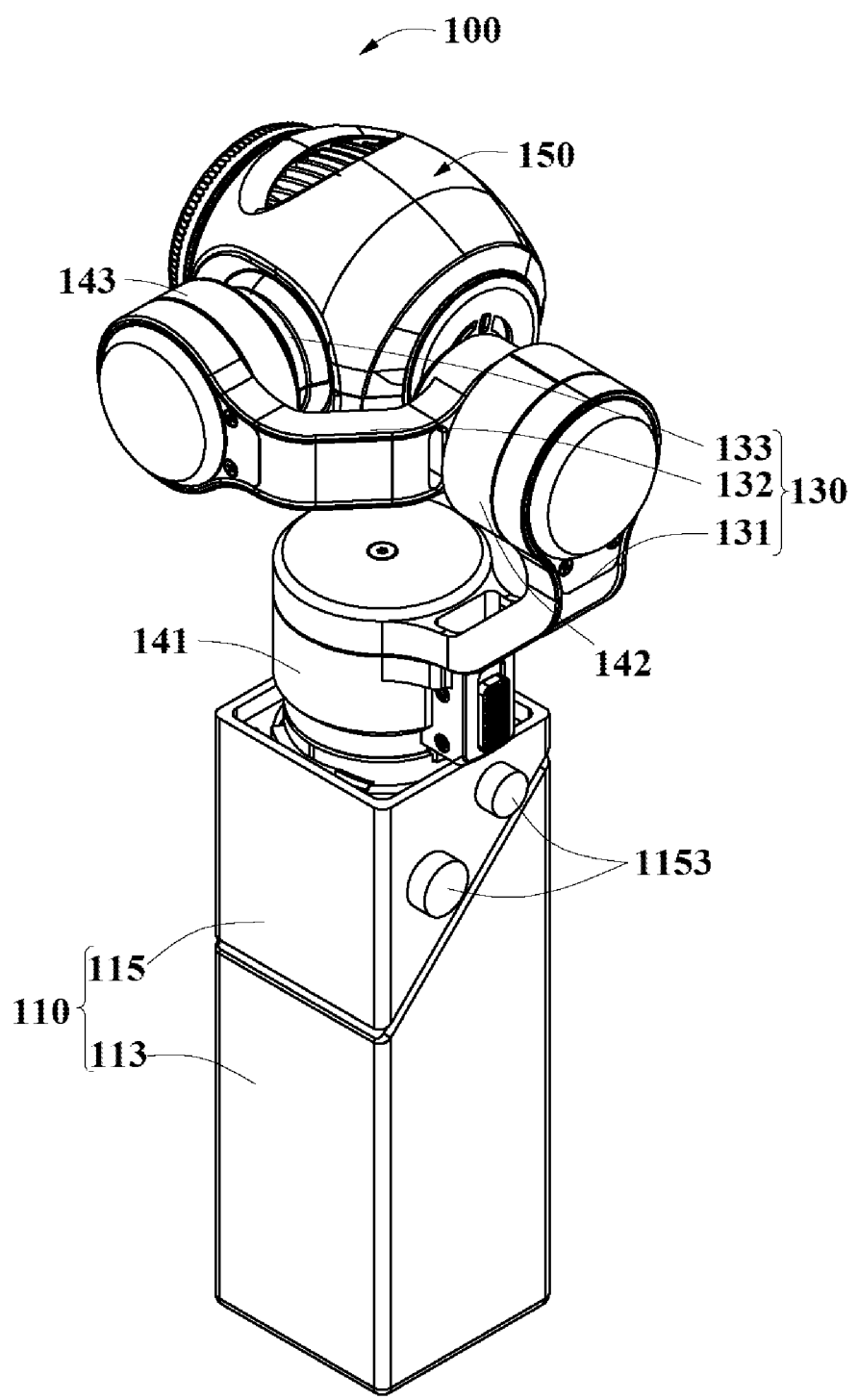
FIG. 1 shows a perspective view of a first attitude of a handheld gimbal in accordance with a first embodiment of the present disclosure.
Figure 2:
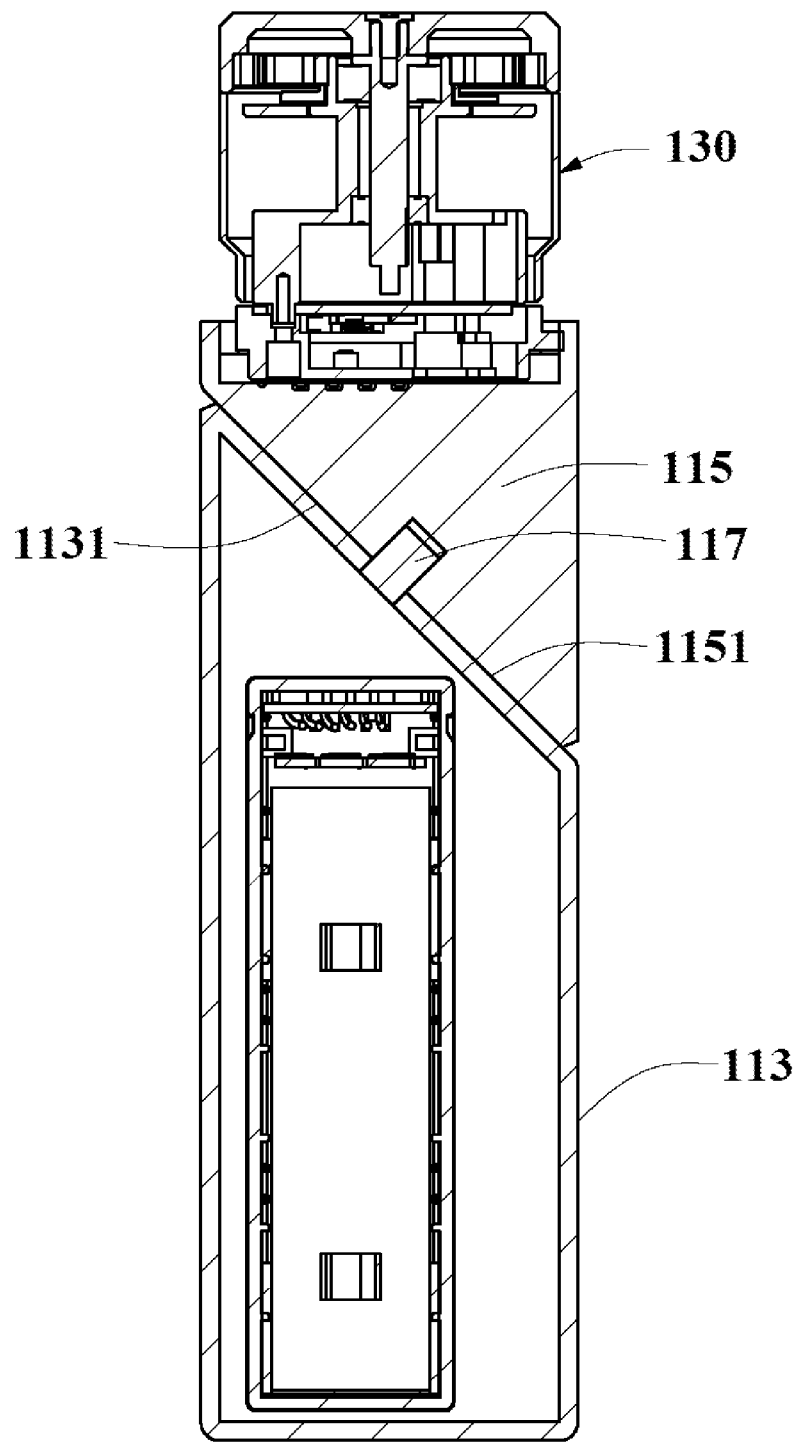
FIG. 2 shows a partial cross-sectional view of the handheld gimbal of FIG. 1.

FIGS. 1 and 2 show a handheld gimbal 100 in accordance with a first embodiment of the disclosure. The handheld gimbal 100 can comprise a handle 110 and a stabilizer 130 provided at an end of the handle 110. The stabilizer 130 can carry an imaging assembly 150.

The handle 110 can comprise a grip portion 113 and a rotating portion 115 rotatably connected to the grip portion 113. A first fitting surface 1131 can be formed at one end of the grip portion 113 which is proximal to the rotating portion 115. A rotating shaft 117 can be formed on the first fitting surface 1131 of the handle 110.

The rotating portion 115 and the grip portion 113 can be rotatably connected by the rotating shaft 117. A second fitting surface 1151 corresponding to the first fitting surface 1131 can be formed at an end of the rotating portion 115 which is proximal to the grip portion 113. The first fitting surface 1131 and the second fitting surface 1151 can be oppositely arranged, such that the rotating portion 115 can be guided and limited while the rotating portion 115 is rotating. In some embodiments, the first fitting surface 1131 and the second fitting surface 1151 can be inclined surfaces.

In some embodiments, the first fitting surface 1131 can be inclined from one end of the grip portion 113 which is proximal to the rotating portion 115 toward the other end of the grip portion 113. The second fitting surface 1151 can be inclined from one end of the rotating portion 115 which is proximal to the grip portion 113 toward the other end of the rotating portion 115. A shaft hole (not shown) corresponding to the rotating shaft 117 can be provided on the second fitting surface 1151. The rotating shaft 117 can be received in the shaft hole and can be pivotally connected to a sidewall of the shaft hole, such that the rotating portion 115 can be rotated relative to the grip portion 113.

An operational portion 1153 can be provided on a side of the rotating portion 115 to facilitate a user in operating the imaging assembly 150. For instance, the operational portion 1153 can effect a zooming, a focusing and an imaging of the imaging assembly 150. The operational portion 1153 can include an operation button. Optionally, the operational portion 1153 can be provided as a touch panel.

It will be appreciated that, the rotating shaft 117 can be provided to a component other than the first fitting surface 1131. For instance, the rotating shaft 117 can be provided on the second fitting surface 1151 in which case the shaft hole can be formed on the first fitting surface 113. In some instances, the first fitting surface 1131 and the second fitting surface 1151 can be omitted. For example, the grip portion 113 is not provided with the first fitting surface 1131, and the rotating portion 115 is not provided with the second fitting surface 1151 corresponding to the first fitting surface 1131. The grip portion 113 and the rotating portion 115 can be provided capable of rotating relative to each other. For example, other parts can be provided on the grip portion 113 and/or the rotating portion 115 so long as the rotating portion 115 can be rotated relative to the grip portion 113. For example, mounting structures can be provided protruding from other sidewalls of the grip portion 113 and the rotating portion 115, the mounting structure of the grip portion 113 being rotatably connected to the mounting structure of the rotating portion 115 via a rotating shaft 117. In some embodiments, the first fitting surface 1131 and the second fitting surface 1151 can be provided with a positioning mechanism. When the rotating portion 115 is rotated relative to the grip portion 113 to a predetermined position, the positioning mechanism can lock a position of the rotating portion 115 relative to the grip portion 113. In some embodiments, electrical connectors can be provided at the rotating portion 115 and the grip portion 113. For instance, corresponding electrical connectors can be respectively provided on the first fitting surface 1131 and the second fitting surface 1151. When the rotating portion is rotated relative to the grip portion 113 to a predetermined position, the electrical connectors can electrically connect the stabilizer 130, the imaging assembly 150 and the grip portion 113, allowing a control of the imaging assembly and/or the stabilizer 130 by the grip portion 113.

Figure 3:
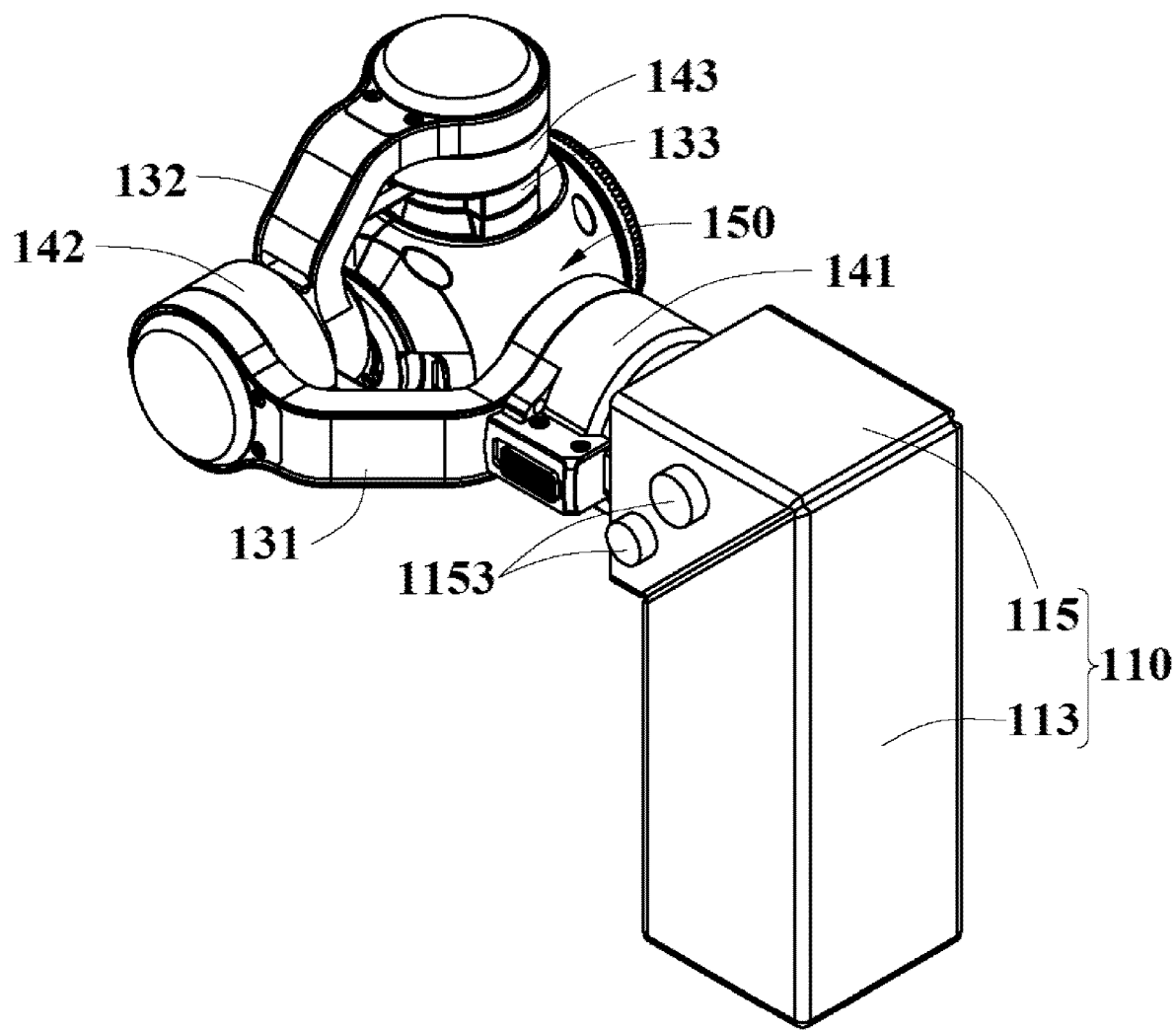
FIG. 3 shows a perspective view of a second attitude of the handheld gimbal of FIG. 1.

The stabilizer 130 can comprise at least one bracket capable of being rotatably connected to the rotating portion 115. The imaging assembly 150 can be provided and supported on the bracket. In some embodiments, the brackets can comprise a first bracket 131 (as shown in FIG. 3), a second bracket 132 and a third bracket 133 rotatably connected in this order. The first bracket 131 can be connected to the rotating portion 115 and rotated relative to the rotating portion 115. The first bracket 131 can be connected with the rotating portion 115 using a quick release mechanism which is capable of being quickly engaged and disengaged. The first bracket 131 can rotate about a first axis. The second bracket 132 can rotate about a second axis. The third bracket 133 can rotate about a third axis. The first axis, the second axis and the third axis can be substantially perpendicular to one another.

In some embodiments, as shown in FIG. 1, when the handheld gimbal operates at a first attitude, the brackets can be arranged as pitch bracket, roll bracket and yaw bracket from an innermost side to an outermost side, which the innermost side being a side directly connected to the imaging assembly 150 (i.e., the third bracket 133). When the handheld gimbal 100 is at the first attitude, the imaging assembly 150 can be positioned above the rotating portion 115. The handheld gimbal 100 can be in vertical imaging mode, and the rotating portion 115 and the grip portion 113 can be superimposed substantially along a same straight line to form a cylinder. The third bracket 133 can rotate about the third axis at an angle ranging from −45° to +45°. The second bracket 132 can rotate about the second axis at an angle ranging from −45° to +90°. The first bracket 131 can rotate about the first axis at an angle ranging from −360° to +300°. It will be apparent that, an angle of rotation of the third bracket 133 about the third axis is not limited to a range from −45° to +45°, an angle of rotation of the second bracket 132 about the second axis is not limited to a range from −45° to +90°, and an angle of rotation of the first bracket 131 about the first axis is not limited to a range from −360° to +300°.

It will be appreciated that, the bracket arrangement of the stabilizer 130 from the innermost side to the outermost side is not limited to the example of illustrative embodiment. The bracket arrangement of the stabilizer can be designed in accordance with actual needs.

The first bracket 131 can be rotatably connected to the rotating portion 115 via a first driving member 141, the second bracket 132 can be rotatably connected to the first bracket 131 via a second driving member 142, and the third bracket 133 can be rotatably connected to the second bracket 132 via a third driving member 143. In some embodiments, the first driving member 141, the second driving member 142 and the third driving member 143 can each be a brushless motor. The first driving member 141 can be mounted on the rotating portion 115 and connected to the first bracket 131. The second driving member 142 can be connected between the first bracket 131 and the second bracket 132. The third driving member 143 can be connected between the third bracket 133 and the second bracket 132 to directly drive a rotation of the imaging assembly 150.

In some embodiments, the imaging assembly 150 can be a camera. The imaging assembly 150 can be carried on the third bracket 133.

When a change in the attitude is needed, the rotating portion 115 can be rotated relative to the grip portion 113 to switch the handheld gimbal 100 to a second attitude. Referring to FIG. 3, when the handheld gimbal 100 operates at the second attitude, the imaging assembly 150 and the rotating portion 115 can be positioned along a same horizontal line. An angle of intersection formed by the rotating portion 115 and the grip portion 113 can be substantially 90°, and the handheld gimbal 100 can be in a horizontal imaging mode. The brackets can be arranged as a yaw bracket, a roll bracket and a pitch bracket from the innermost side to the outermost side.

When the handheld gimbal 100 operates at the second attitude, the third bracket 133 can rotate about the third axis at an angle ranging from −45° to +135°, the second bracket 132 can rotate about the second axis at an angle ranging from −45° to +45°, and the first bracket 131 can rotate about the first axis at an angle ranging from −360° to +300°.

It will be apparent that, the angle of rotation of the third bracket 133 about the third axis is not limited to a range from −45° to +135°, the angle of rotation of the second bracket 132 about the second axis is not limited to a range from −45° to +45°, and the angle of rotation of the first bracket 131 about the first axis is not limited to a range from −360° to +300°.

It will be appreciated that, when the stabilizer 130 operates under the second attitude, the bracket arrangement from the innermost side to the outermost side is not limited to the example of illustrative embodiment. The bracket arrangement of the stabilizer can be designed in accordance with actual needs.

It will be appreciated that, the first attitude and the second attitude of the handheld gimbal 100 are not limited to the example of illustrative embodiment. For example, the first attitude can be an attitude under which the imaging assembly 150 and the rotating portion 115 are positioned along a same horizontal line, and the angle of intersection formed by the rotating portion 115 and the grip portion 113 is substantially 90°. In other words, the first attitude can be an attitude under which the handheld gimbal 100 is in the horizontal imaging mode. The second attitude can be an attitude under which the imaging assembly 150 is positioned above the rotating portion 115. In other words, the second attitude can be an attitude under which the handheld gimbal 100 is in the vertical imaging mode. A switch between the first attitude and the second attitude of the handheld gimbal 100 can be a switch between two different attitudes of the handheld gimbal 100.

It will be appreciated that, the imaging assembly 150 can be other types of electronic apparatus, including a navigator, an electronic book, a playing apparatus, a smartphone and a tablet.

Figure 4:
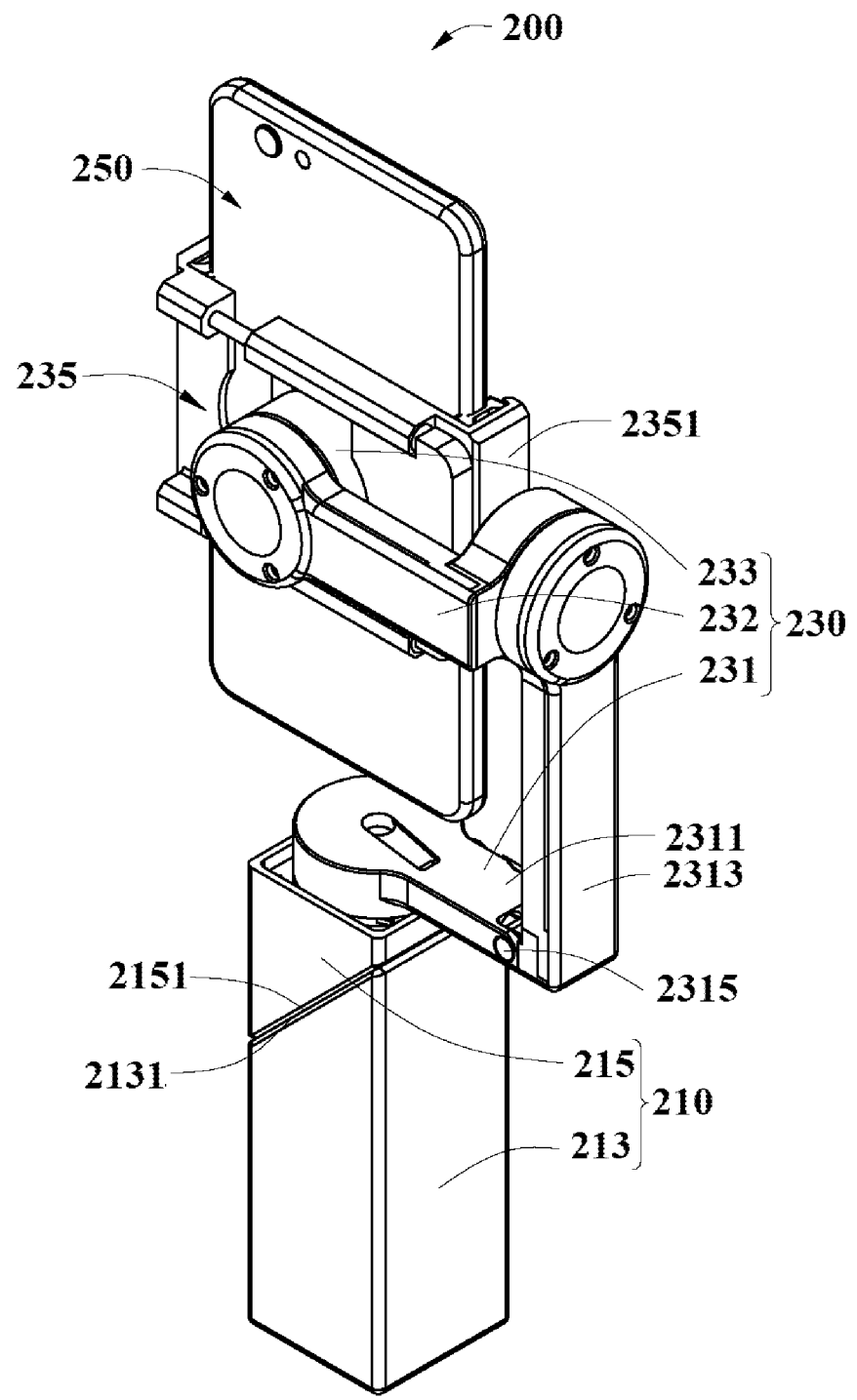
FIG. 4 shows a perspective view of a first attitude of a handheld gimbal provided by a second embodiment of the present disclosure.

FIG. 4 shows a handheld gimbal 200 in accordance with a second embodiment of the disclosure. The handheld gimbal 200 can comprise a handle 210 and a stabilizer 230 provided at an end of the handle 210. The stabilizer 230 can carry an imaging assembly 250.

The handle 210 can comprise a grip portion 213 and a rotating portion 215 rotatably connected to the grip portion 213. A first fitting surface 2131 can be formed at an end of the grip portion 213 which is proximal to the rotating portion 215. A rotating shaft 217 can be formed on the first fitting surface 2131 of the handle 210.

The rotating portion 215 can be rotatably connected to the rotating shaft 217. A second fitting surface 2151 corresponding to the first fitting surface 2131 can be formed at an end of the rotating portion 215 which is proximal to the grip portion 213. The first fitting surface 2131 and the second fitting surface 2151 can be oppositely arranged. In some embodiments, the first fitting surface 2131 and the second fitting surface 2151 can be inclined surfaces. An operational portion can be provided on a side of the rotating portion 215 to facilitate a user in operating the imaging assembly 250.

The stabilizer 230 can comprise at least one bracket capable of being rotatably connected to the rotating portion 215. The imaging assembly 250 can be provided and supported on the bracket. In some embodiments, the brackets can comprise a first bracket 231, a second bracket 232 and a third bracket 233 rotatably connected in this order. In some embodiments, the brackets can be arranged as a roll bracket, a pitch bracket and a yaw bracket from the innermost side to the outermost side.

The first bracket 231 can be connected to the rotating portion 215 and rotated relative to the rotating portion 215. The first bracket 231 can be connected to the rotating portion 215 using a quick release mechanism which is capable of being quickly engaged and disengaged. The first bracket 231 can rotate about a first axis. The second bracket 232 can rotate about a second axis. The third bracket 233 can rotate about a third axis. The first axis, the second axis and the third axis can be substantially perpendicular to one another. Under an operational state of the handheld gimbal 100, the third bracket 233 can rotate about the third axis at an angle ranging from −45° to +45°, the second bracket 232 can rotate about the second axis at an angle ranging from −45° to +135°, and the first bracket 231 can rotate about the first axis at an angle ranging from −360° to +300°. It will be apparent that, the angle of rotation of the third bracket 233 about the third axis is not limited to a range from −45° to +45°, an angle of rotation of the second bracket 232 about the second axis is not limited to a range from −45° to +135°, and an angle of rotation of the first bracket 231 about the first axis is not limited to a range from −360° to +300°.

In some instances, the stabilizer 230 can comprise a supporting seat 235. The supporting seat 235 can be connected to the third bracket 233 to support the imaging assembly 250. In some embodiments, the supporting seat 235 can comprise a first clamping portion 2351 and a second clamping portion 2353. The first clamping portion 2351 can be connected to the third bracket 233. The second clamping portion 2353 can be coupled to the first clamping portion 2351 and can be retractable, such that a size of the supporting seat can be adjusted based upon a size of the carried imaging assembly 250.

In some embodiments, the third bracket 233 can be integrally formed with the first clamping portion 2351. It will be appreciated that, the third bracket 233 can be connected to the first clamping portion by a bolt, a glue or a soldering.

In some embodiments, the imaging assembly 250 can be a cellphone having a camera. The imaging assembly 250 can be clamped between the first clamping portion 2351 and the second clamping portion 2353.

FIG. 4 shows a first attitude of the handheld gimbal 200. When the handheld gimbal 200 operates at the first attitude, the imaging assembly 250 can be positioned above the rotating portion 215. The handheld gimbal 200 can be in a vertical imaging mode, and the rotating portion 215 and the grip portion 213 can be superimposed substantially along a same line to form a cylinder. When the handheld gimbal 200 is at the first attitude, the third bracket 233 can rotate about the third axis at an angle ranging from −45° to +45°, the second bracket 232 can rotate about the second axis at an angle ranging from −45° to +135°, and the first bracket 231 can rotate about the first axis at an angle ranging from −360° to +300°.

Figure 5:
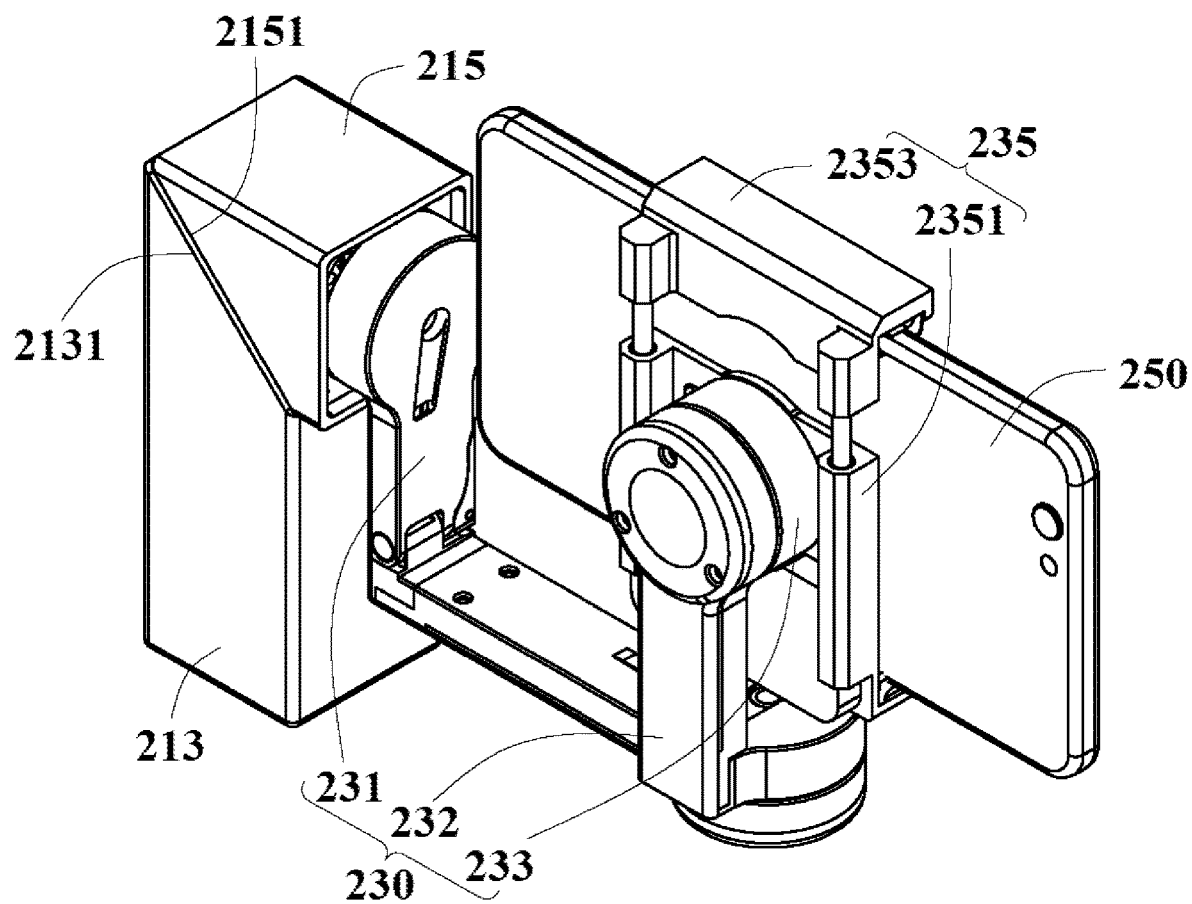
FIG. 5 shows a perspective view of a second attitude of the handheld gimbal in accordance with the second embodiment of the present disclosure.

When a change in attitude is needed, the rotating portion 215 can be rotated relative to the grip portion 213 to switch the handheld gimbal 200 to a second attitude. Referring to FIG. 5, when the handheld gimbal 200 operates at the second attitude, the imaging assembly 250 and the rotating portion 215 can be positioned along a same horizontal line. An angle of intersection formed by the rotating portion 215 and the grip portion 213 can be substantially 90°, and the handheld gimbal 200 can be in a horizontal imaging mode. The brackets can be arranged as a roll bracket, a yaw bracket and a pitch bracket from the innermost side to the outermost side.

When the handheld gimbal 200 operates at the second attitude, the third bracket 233 can rotate about the third axis at an angle at an angle ranging from −45° to +45°, the second bracket 232 can rotate about the second axis at an angle ranging from −45° to +135°, and the first bracket 231 can rotate about the first axis at an angle ranging from −45° to +45°.

It will be apparent that, when the handheld gimbal 200 operates at the second attitude, the angle of rotation of the third bracket 233 about the third axis is not limited to a range from −45° to +45°, the angle of rotation of the second bracket 232 about the second axis is not limited to a range from −45° to +135°, and the angle of rotation of the first bracket 231 about the first axis is not limited to a range from −45° to +45°.

It will be appreciated that, the first attitude and the second attitude of the handheld gimbal 200 are not limited to the example of illustrative embodiment. For example, the first attitude can be an attitude under which the imaging assembly 250 and the rotating portion 215 are positioned along a same horizontal line, and the angle of intersection formed by the rotating portion 215 and the grip portion 213 is substantially 90°. In other words, the first attitude can be an attitude under which the handheld gimbal 200 is in the horizontal imaging mode. The second attitude can be an attitude under which the imaging assembly 250 is positioned above the rotating portion 215. In other words, the second attitude can be an attitude under which the handheld gimbal 200 is in the vertical imaging mode. A switch between the first attitude and the second attitude of the handheld gimbal 200 can be a switch between two different attitudes of the handheld gimbal 200.

In some embodiments, the first bracket 231 can be provided with a foldable structure. Therefore, the stabilizer 230 can be a foldable and portable stabilizer. In some instances, the first bracket 231 can comprise a first connecting portion 2311 and a second connecting portion 2313 coupled to the first connecting portion 2311. The first connecting portion 2311 can be rotatably connected to the rotating portion 215. A rotation shaft 2315 can be provided at a joint between the first connecting portion 2311 and the second connecting portion 2313. An end of the second connecting portion 2313 distal from the first connecting portion 2311 can be connected to the second bracket 232. The second connecting portion 2313 can be rotated relative to the first connecting portion 2311 by the rotating shaft 2315 to effect a folding.

Figure 6:
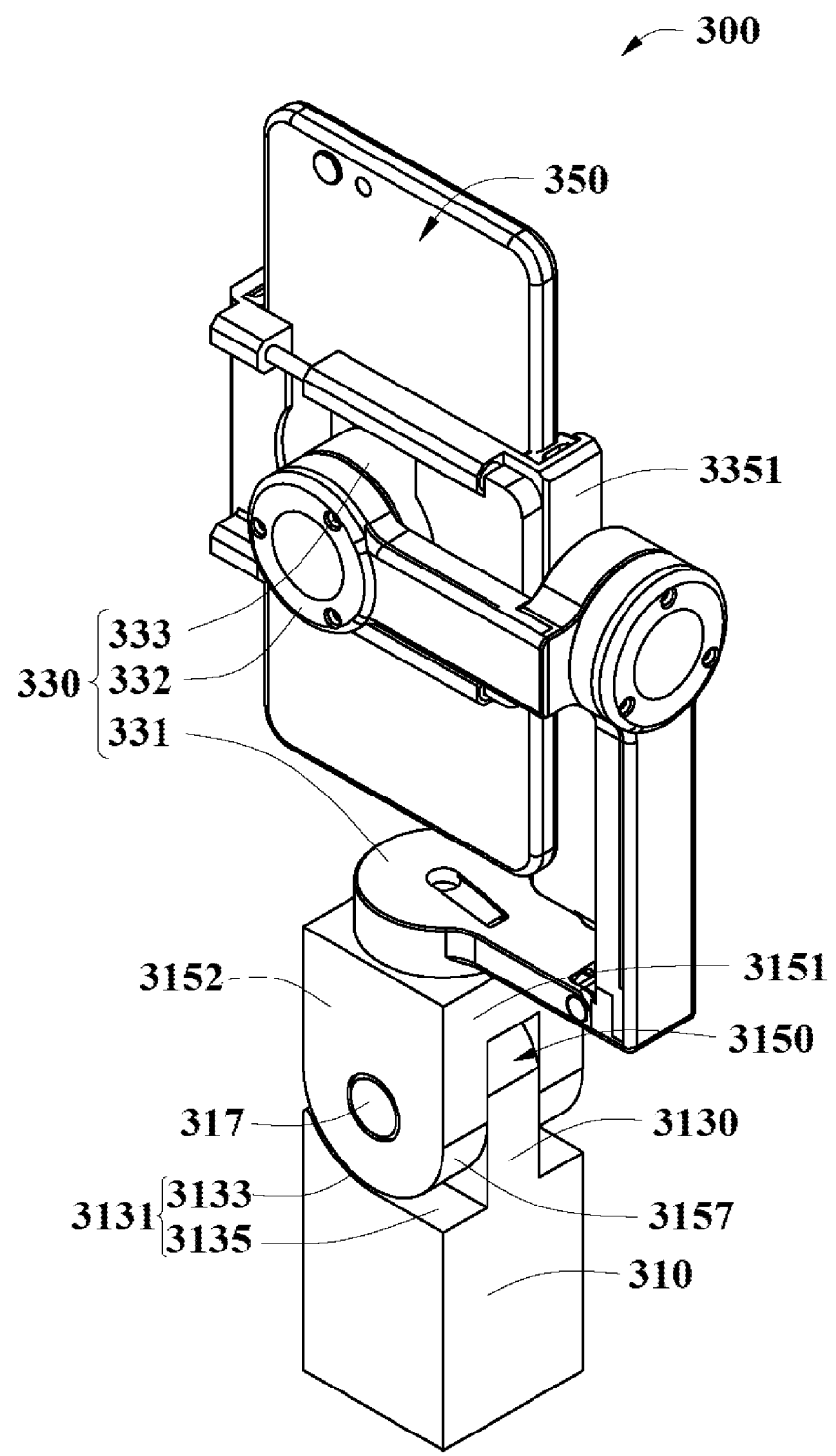
FIG. 6 shows a perspective view of a first attitude of a handheld gimbal in accordance with a third embodiment of the present disclosure.

FIG. 6 shows a handheld gimbal 300 in accordance with a third embodiment of the disclosure. The handheld gimbal in accordance with the third embodiment of the disclosure can be provided with a structure substantially similar to that of the handheld gimbal in accordance with the second embodiment except for a handle 310.

The handheld gimbal 300 in accordance with the third embodiment can comprise a handle 310 and a stabilizer 330 provided at an end of the handle 310. The stabilizer 330 can carry an imaging assembly 350.

The handle 310 can comprise a grip portion 313 and a rotating portion 315 rotatably connected to the grip portion 313. A connecting protrusion 3130 can be formed at an end of the grip portion 313 proximal to the rotating portion 315. The grip portion 313 can be provided with a first fitting surface 3131 at two sides of the connecting protrusion 3130.

An end of the rotating portion 315 proximal to the grip portion 313 can be provided with an substantially arc shape. The rotating portion 315 can comprise a first side 3151, a second side 3152, a third side 3153 and a fourth side 3154 which ate connected each other in this order. A mounting groove 3150 can be formed at an end of the rotating portion 315 proximal to the grip portion 313. The mounting groove 3150 can penetrate the first side 3151 and the third side 3153 of the rotating portion 315. The connecting protrusion 3130 can be received in the mounting groove 3150 and rotatably connected to two sidewalls of the mounting groove 3150 via a rotating shaft 317. A second fitting surface 3157 corresponding to the first fitting surface 3131 can be formed at the end of the rotating portion 315 proximal to the grip portion 313. The first side 3151, the second side 3152, the third side 3153 and the fourth side 3154 can be connected to the second fitting surface 3157. The first fitting surface 3131 and the second fitting surface 3157 can be provided to guide and limit a rotation of the rotating portion 315.

In some embodiments, the first fitting surface 3131 can comprise an arc section 3133 and a planar section 3135 which is continuously connected to the arc section with a smooth transition therebetween. The second fitting surface 3157 can be an arc surface. An operational portion (not shown) can be provided on a side of the rotating portion 315 to facilitate a user in operating the imaging assembly 350.

The stabilizer 330 can comprise at least one bracket capable of being rotatably connected to the rotating portion 315. The imaging assembly 350 can be provided and supported on the bracket. In some embodiments, the brackets can comprise a first bracket 331, a second bracket 332 and a third bracket 333 rotatably connected in this order. The first bracket 331 can be connected to the rotating portion 315 and rotate relative to the rotating portion 315. The first bracket 331 can be connected to the rotating portion 315 using a quick release mechanism which is capable of being quickly engaged and disengaged. The first bracket 331 can rotate about a first axis. The second bracket 332 can rotate about a second axis. The third bracket 333 can rotate about a third axis. The first axis, the second axis and the third axis can be substantially perpendicular to one another. In some embodiments, under an operational state of the handheld gimbal 300, the third bracket 333 can rotate about the third axis at an angle ranging from −45° to +45°, the second bracket 332 can rotate about the second axis at an angle ranging from −45° to +135°, and the first bracket 331 can rotate about the first axis at an angle ranging from −360° to +300°. It will be apparent that, an angle of rotation of the third bracket 333 about the third axis is not limited to a range from −45° to +45°, an angle of rotation of the second bracket 332 about the second axis is not limited to a range from −45° to +135°, and an angle of rotation of the first bracket 331 about the first axis is not limited to a range from −360° to +300°.

In some instances, the stabilizer 330 can comprise a supporting seat 335. The supporting seat 335 can be connected to the third bracket 333 to support the imaging assembly 350. A first clamping portion 3351 and a second clamping portion 3353 retractably connected to the first clamping portion 3351 can be provided on the supporting seat 335.

In some embodiments, the imaging assembly 350 can be a cellphone having a camera. The imaging assembly 350 can be clamped between the first clamping portion 3351 and the second clamping portion 3353.

FIG. 6 shows a first attitude of the handheld gimbal 300. When the handheld gimbal 300 operates at the first attitude, the imaging assembly 350 can be positioned above the rotating portion 315. The handheld gimbal 300 can be in a vertical imaging mode. The first fitting surface 3131 can be fitted with and abut against the second fitting surface 3157. When the handheld gimbal 300 is at the first attitude, the third bracket 333 can rotate about the third axis at an angle ranging from −45° to +45°, the second bracket 332 can rotate about the second axis at an angle ranging from −45° to +135°, and the first bracket 331 can rotate about the first axis at an angle ranging from −360° to +300°.

Figure 7:
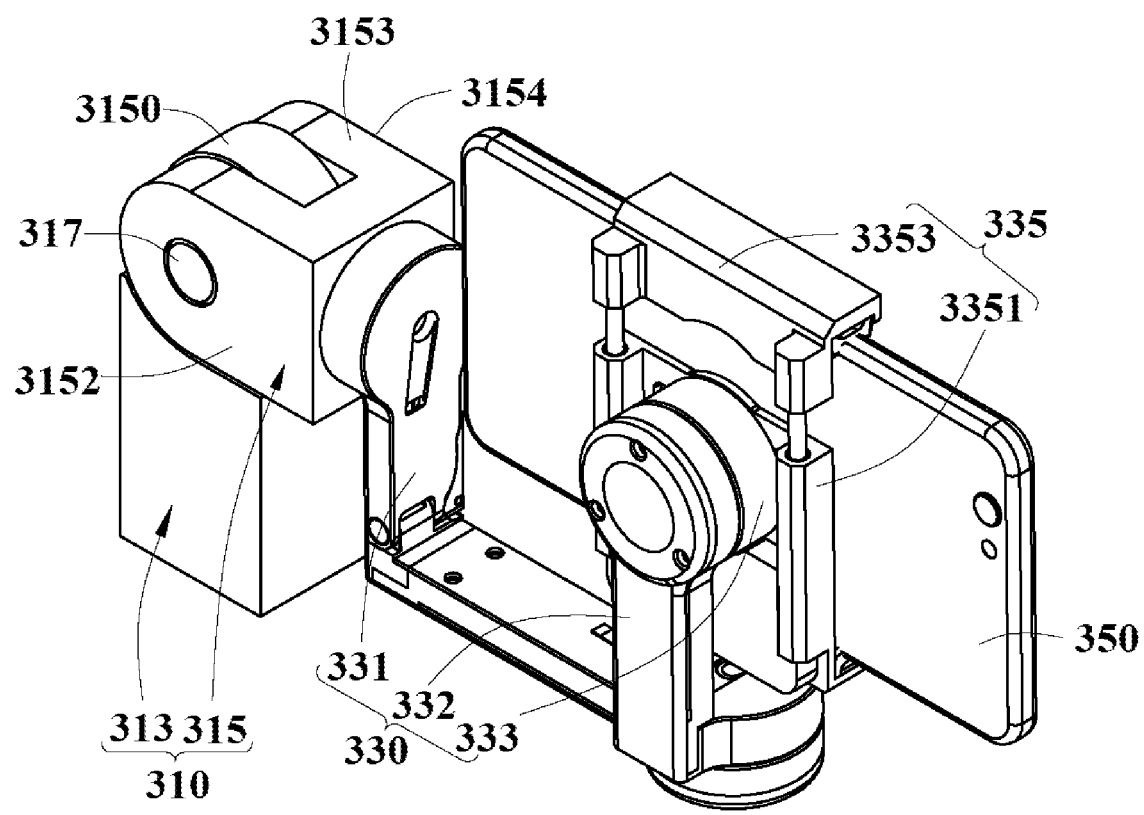
FIG. 7 shows a perspective view of a second attitude of the handheld gimbal in accordance with the third embodiment of the present disclosure.

When a change in attitude is needed, the rotating portion 315 can be rotated relative to the grip portion 313 to switch the handheld gimbal 300 to a second attitude. Referring to FIG. 7, when the handheld gimbal 300 operates at the second attitude, the imaging assembly 350 and the rotating portion 315 can be positioned along a same horizontal line. An angle of intersection formed by the rotating portion 315 and the grip portion 313 can be substantially 90°, and the handheld gimbal 300 can be in a horizontal imaging mode. The arc section 3133 of the first fitting surface 3131 can be fitted with and abut against the second fitting surface 3157, and the planar section 3135 can be fitted with the first side 3151. When the handheld gimbal 300 operates at the first attitude, the third bracket 333 can rotate about the third axis at an angle ranging from −45° to +45°, the second bracket 332 can rotate about the second axis at an angle ranging from −45° to +135°, and the first bracket 331 can rotate about the first axis at an angle ranging from −360° to +300°.

It will be appreciated that, the first attitude and the second attitude of the handheld gimbal 300 are not limited to the example of illustrative embodiment. For example, the first attitude can be an attitude under which the imaging assembly 350 and the rotating portion 315 are positioned along a same horizontal line, and the angle of intersection formed by the rotating portion 315 and the grip portion 313 is substantially 90°. In other words, the first attitude can be an attitude under which the handheld gimbal 300 is in the horizontal imaging mode. The second attitude can be an attitude under which the imaging assembly 350 is positioned above the rotating portion 315. In other words, the second attitude can be an attitude under which the handheld gimbal 300 is in the vertical imaging mode. A switch between the first attitude and the second attitude of the handheld gimbal 300 can be a switch between two different attitudes of the handheld gimbal 300.

It will be appreciated that, the mounting groove 3150 can be omitted, in which case the grip portion 313 can be directly and rotatably connected to the rotating portion 315.

The handles 110, 210 and 310 of the handheld gimbals 100, 200 and 300 as provided by the disclosure can comprise the grip portions 113, 213 and 313 and the rotating portions 115, 215 and 315 rotatably connected to the grip portions 113, 213 and 313. A switch in an attitude of the handheld gimbals 100, 200 and 300 can be effected by simply rotating the rotating portions 115, 215 and 315 relative to the grip portions 113, 213 and 313. There's no need to change an attitude of the handles 110, 210 and 310, thereby facilitating a user of the handheld gimbals 100, 200 and 300.

It will be appreciated that, numerous variations and substitutions will occur to those skilled in the art without departing from the scope of the disclosure. Those variations and substitutions made in accordance with the spirit of the disclosure are within the scope of the present disclosure.

What is claimed is:

1. A handheld gimbal comprising:
    a handle comprising a grip portion and a rotating portion rotatably connected to the grip portion, the grip portion and the rotating portion being positioned along a vertical line at a first attitude; and
    a stabilizer mounted at the rotating portion and positioned distal from the grip portion, the stabilizer being configured to carry an imaging assembly;
    wherein:
        the rotating portion is configured to drive the stabilizer to rotate relative to the grip portion to switch the handheld gimbal from the first attitude to a second attitude, and
        a rotating shaft is provided at the grip portion or the rotating portion, the rotating portion being configured to rotate relative to the grip portion about the rotating shaft, and an intersection angle of the rotating shaft and the vertical line is greater than 0° and less than 180°.

2. The handheld gimbal of claim 1, wherein:
    a first fitting surface is formed at an end of the grip portion proximal to the rotating portion;
    a second fitting surface corresponding to the first fitting surface is formed on the rotating portion; and
    the first fitting surface is fitted with the second fitting surface.

3. The handheld gimbal of claim 2, wherein:
    the first fitting surface and the second fitting surface are inclined surfaces; or
    the first fitting surface comprises an arc section and a planar section continuously connected to the arc section, and the second fitting surface is an arc surface; or
    a rotating shaft is provided at one of the first fitting surface and the second fitting surface, and a shaft hole is provided at another one of the first fitting surface and the second fitting surface, the rotating shaft being received in the shaft hole and pivotally connected to a sidewall of the shaft hole.

4. The handheld gimbal of claim 1, wherein:
    the rotating portion comprises a first side, a second side, a third side, and a fourth side connected to each other in this order;
    a mounting groove is provided at an end of the rotating portion proximal to the grip portion, the mounting groove penetrating the first side and the third side of the rotating portion; and
    a connecting protrusion protruding from the grip portion is received in the mounting groove and rotatably connected to two sidewalls of the mounting groove.

5. The handheld gimbal of claim 1, wherein:
    the first attitude corresponds to a vertical imaging mode, in which the imaging assembly is positioned above the rotating portion, and the rotating portion and the grip portion are superimposed along a same line to form a cylinder; or the second attitude corresponds to a horizontal imaging mode, in which the imaging assembly and the rotating portion are positioned along a same horizontal line.

6. The handheld gimbal of claim 1, wherein the stabilizer comprises at least one bracket rotatably connected to the rotating portion and configured to support the imaging assembly.

7. The handheld gimbal of claim 6, wherein the at least one bracket comprises:
a first bracket connected to the rotating portion and rotatable relative to the rotating portion, the first bracket being configured to rotate about a first axis; and
a second bracket configured to rotate about a second axis.

8. The handheld gimbal of claim 7, wherein the first axis is perpendicular to the second axis.

9. The handheld gimbal of claim 7, wherein:
the first bracket is configured to rotate about the first axis in a range from −360° to +300° when the handheld gimbal operates at the first attitude and when the handheld gimbal operates at the second attitude; and
the second bracket is configured to rotate about the second axis in a range from −45° to +90° when the handheld gimbal operates at the first attitude, and in a range from −45° to +45° when the handheld gimbal operates at the second attitude.

10. The handheld gimbal of claim 7, wherein the at least one bracket further comprises a third bracket, the third bracket being rotatably connected to the second bracket and configured to rotate about a third axis.

11. The handheld gimbal of claim 10, wherein the third axis is perpendicular to the first axis and the second axis.

12. The handheld gimbal of claim 10, wherein the third bracket is configured to rotate about the third axis in a range from −45° to +45° when the handheld gimbal operates at the first attitude and in a range from −45° to +135° when the handheld gimbal operates at the second attitude.

13. The handheld gimbal of claim 7, wherein:
the first bracket comprises:
a first connecting portion; and
a second connecting portion rotatably connected to the first connecting portion via a rotation shaft provided at a joint between the first connecting portion and the second connecting portion; and
an end of the second connecting portion distal from the first connecting portion is connected to the second bracket.

14. The handheld gimbal of claim 6, wherein the stabilizer further comprises a supporting seat connected to the at least one bracket and configured to carry the imaging assembly.

15. The handheld gimbal of claim 14, wherein the supporting seat comprises:
a first clamping portion connected to the at least one bracket; and
a second clamping portion retractably coupled to the first clamping portion.

16. The handheld gimbal of claim 6, wherein:
when the handheld gimbal operates at the first attitude, the at least one bracket is arranged as a pitch bracket, a roll bracket, and a yaw bracket from an innermost side to an outermost side, the innermost side being a side of the at least one bracket that is configured to be directly connected to the imaging assembly; or
when the handheld gimbal operates at the second attitude, the at least one bracket is arranged as the yaw bracket, the roll bracket, and the pitch bracket from the innermost side to the outermost side.

17. The handheld gimbal of claim 1, further comprising:
an operational portion provided at the rotating portion and configured to control the imaging assembly.

18. The handheld gimbal of claim 17, wherein the operational portion comprises at least one of a button or a touch panel.

19. The handheld gimbal of claim 1, further comprising:
electrical connectors provided at the rotating portion and the grip portion, the electrical connectors being configured to electrically connect the stabilizer, the imaging assembly, and the grip portion when the rotating portion is rotated relative to the grip portion to a predetermined position.

* * * * *